United States Patent
Linke et al.

(10) Patent No.: US 10,576,678 B2
(45) Date of Patent: Mar. 3, 2020

(54) DEVICE FOR BLOW MOULDING CONTAINERS

(71) Applicant: KHS Corpoplast GmbH, Hamburg (DE)

(72) Inventors: Michael Linke, Hamburg (DE); Rolf Baumgarte, Ahrensburg (DE); Michael Litzenberg, Geesthacht (DE); Frank Lewin, Tangstedt (DE); Margit Kiefer, Hamburg (DE)

(73) Assignee: KHS Corpoplast GmbH, Hamburg (DE)

( * ) Notice: Subject to any disclaimer, the term of this patent is extended or adjusted under 35 U.S.C. 154(b) by 153 days.

(21) Appl. No.: 15/569,815

(22) PCT Filed: Apr. 30, 2015

(86) PCT No.: PCT/EP2015/000892
§ 371 (c)(1),
(2) Date: Oct. 27, 2017

(87) PCT Pub. No.: WO2016/173607
PCT Pub. Date: Nov. 3, 2016

(65) Prior Publication Data
US 2018/0141261 A1    May 24, 2018

(51) Int. Cl.
*B29C 49/12* (2006.01)
*B29C 49/58* (2006.01)
*B29C 49/06* (2006.01)

(52) U.S. Cl.
CPC .............. *B29C 49/12* (2013.01); *B29C 49/58* (2013.01); *B29C 49/06* (2013.01);
(Continued)

(58) Field of Classification Search
CPC .... B29C 2049/1252; B29C 2049/1266; B29C 2049/129; B29C 2049/128; B29C 2049/5862; B29C 2049/5875; B29C 49/12
See application file for complete search history.

(56) References Cited

U.S. PATENT DOCUMENTS

| 4,076,071 A | 2/1978 | Rosenkranz et al. |
| 5,346,386 A | 9/1994 | Albrecht et al. |

(Continued)

FOREIGN PATENT DOCUMENTS

| DE | 19906438 A1 | 8/2000 |
| DE | 102007008023 A1 | 8/2008 |

(Continued)

*Primary Examiner* — Robert B Davis
(74) *Attorney, Agent, or Firm* — Rankin, Hill & Clark LLP

(57) ABSTRACT

The device is used for the blow-molding of containers. A preform made of thermoplastic material, following a thermal conditioning within a blow-mold, is stretched by a stretching rod and is reshaped by effects of blowing pressure into the form of a container. A specification for the positioning of the stretching rod occurs through the use of a linear drive. Blowing pressure is created through the use of at least one positionable blowing gas supply. The linear drive is at least intermittently mechanically coupled with the positionable blowing gas supply and the stretching rod in such a way that coordinated movement kinetics are carried out. The coupling means and the coupled elements are constructed in such a manner that the axis of motion and the resulting force-effect axis form a common spatial axis.

26 Claims, 10 Drawing Sheets

Figure 1:
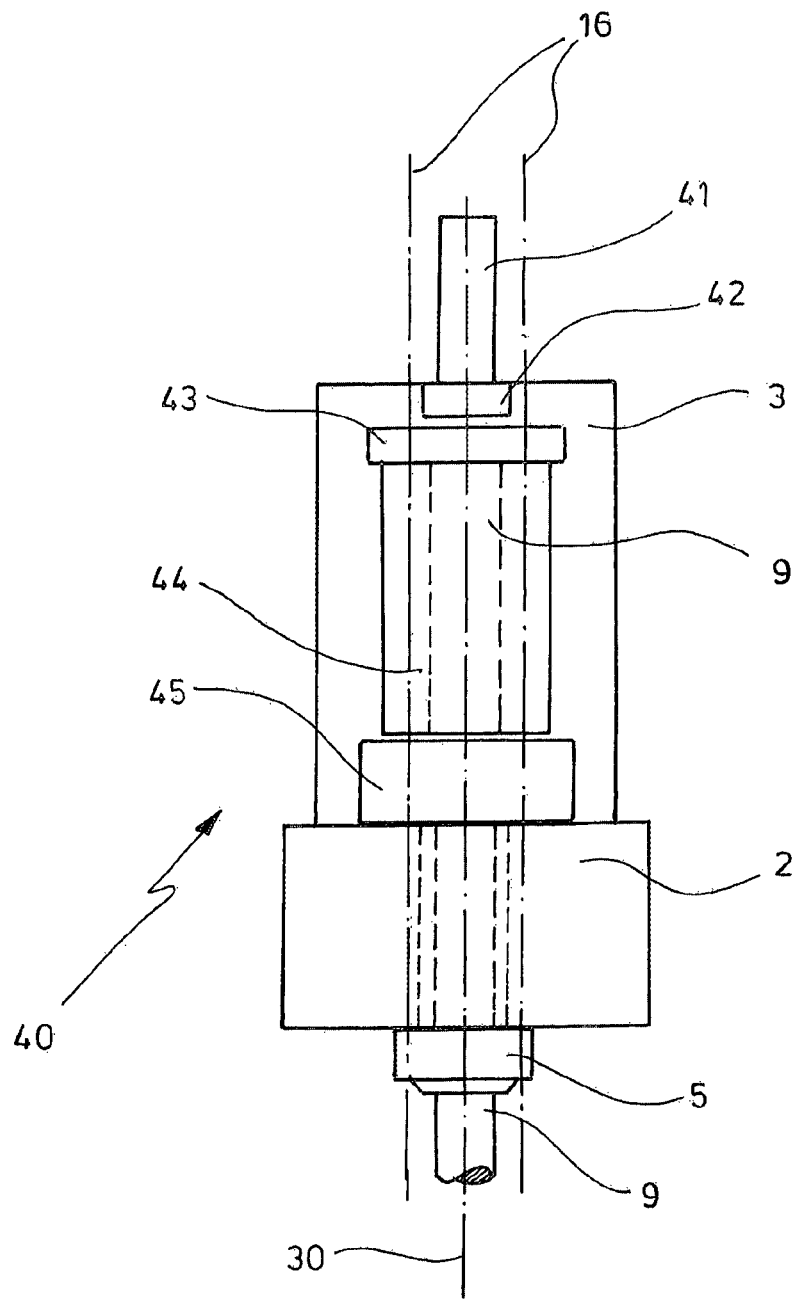

(52) U.S. Cl.
CPC  *B29C 2049/129* (2013.01); *B29C 2049/1252* (2013.01); *B29C 2049/5862* (2013.01); *B29C 2049/5875* (2013.01)

(56) References Cited

U.S. PATENT DOCUMENTS

| | | | |
|---|---|---|---|
| 5,648,026 | A | 7/1997 | Weiss |
| 6,736,625 | B1 * | 5/2004 | Linglet .................. B29C 49/12 425/182 |
| 2010/0252945 | A1 | 10/2010 | Eudier et al. |
| 2011/0241265 | A1 | 10/2011 | Schmidt |
| 2011/0287126 | A1 | 11/2011 | Geltinger et al. |
| 2012/0207872 | A1 | 8/2012 | Lisch et al. |
| 2013/0164404 | A1 * | 6/2013 | Maki .................. B29D 22/003 425/535 |

FOREIGN PATENT DOCUMENTS

| | | |
|---|---|---|
| DE | 102007009026 A1 | 8/2008 |
| DE | 102009006508 A1 | 7/2010 |
| DE | 202013008341 U1 | 11/2013 |
| DE | 102008064770 B3 | 11/2014 |
| JP | 2000043131 A | 2/2000 |

\* cited by examiner

Schnitt A-A

DEVICE FOR BLOW MOULDING CONTAINERS

The invention refers to a device for the blow-molding of containers out of a thermoplastic material, featuring a stretching rod for the stretching of the preform, a blowing nozzle for the supply of a blowing gas into the preform and for the development of the blowing pressure that is necessary for preforms, as well as coupling means for the coupling of the blowing nozzle and a stretching rod for the achievement of coordinated movement kinetics.

The device for the blow-molding of containers out of a thermoplastic material is a component of a blowing station that exhibits a blow-mold and has a stretching rod for the impacting of a preform that is usable in the blow-mold. The stretching rod is connected with a linear drive through a coupling means, and, where applicable, a separation means. The blowing station has a positionable blowing gas supply.

In the case of container molding by effect of blowing pressure, preforms made out of thermoplastic material, for example, preforms made of PET (polyethylene terephthalate), are directed within the blow-molding machine to various processing stations. Typically, this type of blow-molding machine has a heating device as well as a blowing device in the area within which the previously tempered preform is expanded into a container by means of biaxial orientation.

The expansion occurs with the help of compressed air, which is directed into the preform that is to be expanded. The technical procedure with such an expansion of the preform, according to this method, is explained in DE-OS 43 40 291. The previously mentioned introduction of the gas that is under pressure, includes both the introduction of compressed gas in the evolving container-blowing gas as well as also the introduction of compressed gas in the preform at the start of the blowing procedure.

The basic construction of a blowing station used for container molding is described in DE-OS 42 12 583. Possibilities for the tempering of the preforms are discussed in DE-OS 23 52 926.

Within the device for the blow-molding, the preforms as well as the blow-molded containers can be transported with a variety of handling units. The use of conveyor mandrels, upon which the preforms are attached, has shown itself to be particularly tried and trusted. The preforms can however also be handled with other carrier devices. The use of grippers for the handling of preforms and the use of expanding mandrels, which can be implemented for the holding of the preform in the mouth area, also belong among the available constructions.

A handling of containers making use of transfer paddles is, for example, described in DE-OS 199 06 438 with an arrangement of the transfer wheel between a blowing wheel and a dispensing stretch.

A handling of containers making use of transfer paddles is, for example, described in DE-OS 199 06 438 with an arrangement of the transfer wheel between a blowing wheel and a dispensing stretch.

The handling of the preforms that has already been explained takes place on the one hand in a so-called two-step procedure, in which the preforms are initially produced in an injection molding procedure, subsequently stored on a temporary basis, and then only later conditioned as regards their temperature and blown out into a container. On the other hand, there is an implementation that makes use of the so-called one-step procedure, in which the preforms are appropriately tempered and subsequently blown out immediately following their production using injection molding and after sufficient hardening.

This means that the preforms are either blow-formed out of the first heat or separately conditioned for temperature and subsequently blow-formed. These relationships are described in DE 10 2007 009 026 A1.

As regards the blowing stations that are used, there are a variety of embodiments that are known. In the case of blowing stations, which are arranged on rotating transport wheels, a book-like foldability of the form carrier is frequently encountered. It is however also possible to employ form carriers that are relocatable in relation to one another or are otherwise directed. In the case of stationary blowing stations, which are, in particular, suitable to accommodate multiple cavities for container molding, it is typical that plates that are arranged parallel to one another are used as carriers.

The execution of the movement coordination of the stretching rod can according to various principles. It is known, for example, to position the stretching rod through the use of cam rollers, which are guided along curved tracks. It is possible to achieve a particularly high degree of precision and reproducibility of the stretching operation with a cam control of this type, when the cam rollers are run bilaterally and hereby follow a precisely defined track. Cam controls of this type do however have the disadvantage that heavy and spatially large-sized curve tracks must be used, which, as a rule, are made out of steel. A conversion of the stretching system to carry out modified stretching motions causes a major expenditure.

There are likewise other cam controls that are known, in which the cam rollers only run in one direction and are pressed against the one-sided guidance track making use of pneumatic cylinders. Here we have a construction that is simplified and is thereby more economical, as a function of the stretching forces that occur, and it is possible that the cam roller can lose adherence perpendicularly to the engaging pneumatic clamping force and the stretching procedure hereby abandons the coordinated process characteristics. A reduced quality of the blown container results.

It is possible to produce very accurate stretching systems through the use of electric linear motors. Linear motors of the required power are, at this time, however still very expensive and furthermore require a large installation space.

Pure pneumatic stretching systems, as well as hybrid systems, whereby both pneumatic drives as well as also linear motors are used, have likewise become known.

Generally, pneumatic control devices or cam controls are used for positionable blowing gas supply. The positionable blowing gas supply is hereby guided against the preform that is to be blown out or, alternatively, against a contact area of the blow-molds and braced against the respective contact area in such a way that a sufficient pressure seal is provided so as to build up blowing pressure through the supply of the blowing gas. In this manner, an arrangement of the blowing stations has to ensure that sufficient installation space is provided for both the stretching rod drive, as well as also the drive of the positionable blowing gas supply.

The blowing gas supply, in the form of a so-called blowing nozzle, that is to be positioned and the device that is to be moved in a linear manner, in the form of a stretching rod, must thus be moved in relation to the preform. In both cases, it is necessary to respectively execute a linear path of motion in the axial direction of the preform after the radial pre-positioning.

For the execution of a linear path of motion of the stretching rod, DE 10 2007 008 023 A1 suggests that the rotational movement of a motor shaft of a servomotor be transformed by means of a mechanical linkage set-up into a lifting movement of the stretching rod. A method and device for the blow-molding of containers is disclosed in DE 10 2009 006 508 A1. A preform made out of a thermoplastic material is blown out following a thermal conditioning within a blow-mold by a stretching rod and reshaped under the effect of blowing pressure into the container. A specification of the positioning of the stretching rod occurs upon utilization of a stretching rod drive. Blowing pressure is generated under the utilization of at least one positionable blowing gas supply.

The stretching rod drive is at least intermittently mechanically coupled with the positionable blowing gas supply in such a way that a joint motion is carried out.

This means that it is known in the state of the art that the linear motions of the blowing nozzle and the stretching rod are coupled with one another.

DE 10 2007 009 026 A1 shows a device for blow-molding. According to the same, a sealing element is realized in the area of the blowing device that is directed against a support ring of the preform and with which, following a contact with the support ring, the sealing element is initially mechanically preloaded against the support ring and subsequently further loaded pneumatically.

The sealing element for the sealing of the preform extends in the area of a mouth section of a compensation space surrounding the preform going from one stop of a connecting unit in the direction of an insertion opening of the connection element and exhibits at least one dome area, which extends in a direction opposite to the support surface of the connection element.

Through the sealing of an area of the mouth section of the preform that is achieved through the use of the sealing element, it is possible to build up pressure outside of the mouth section, which counteracts a deformation of the mouth section during use of blow-forming technology. This is achieved through the same pressure being present on all sides of the mouth section.

The mechanical preload of the sealing element provides a sufficient seal to allow for a further pneumatic tensioning of the seal in a second process stage. The pneumatic tensioning, in particular, allows for there to also be an increase of the tensioning of the sealing element with increasing pressure needing to be sealed.

To reach the mechanical preload of the sealing element through the linear method of the blowing nozzle, there must be a precise linear positioning. Following the linear positioning of the blowing nozzle and the further pneumatic tensioning of the seal, the stretching rod must be moved in a linear direction.

These linear motions must be coordinated with one another.

A further disadvantage in the technical solutions according to the state of the art can be recognized in the fact that the travel paths of the blowing nozzle and stretching rod are frequently realized through drives that work independently one from the other. This is disadvantageous, in particular, as regards the costs and the weights of the blowing station.

In the state of the art, one only finds technical solutions, where the force axes or alternatively the axes of the linear motions are not congruent. As a result, torque loads on the guides come into being as regards the linear guides through the resulting levers. The consequence of these additional loads is that the guides must be laid out accordingly. Both as regards the dimensioning, as well as also as regards the frequently-required lubrication, costs and weight are disadvantageous consequences.

It is thus the purpose of this invention to move both the blowing nozzle as well as also the stretching rod within a blowing station in a linear manner such that the blow-molding of the container is supported through suitable movement kinetics, and contemporaneously reduces the introduction of forces in the linear guides and thereby a cost-effective lightweight construction is promoted.

This purpose is thus solved according to the invention, in that a drive motion line of a linear drive motion, that is transmitted into the device, and the axes of motion of the blowing nozzle and the stretching rod run parallel to one another and lay together in a substantially congruent spatial direction, such that a common spatial axis is generated. Through this it is achieved that, following a first start positioning of the blowing station in relation to the preform, initially the mechanical preload of the sealing element between the blowing nozzle mouth and support ring of the preforms and after the further pneumatic tensioning, the generation of the container, the linear motion of the stretching rod is undertaken together with the blowing pressure.

So as to support the lightweight construction of the linear guides without lubrication, it is, in particular, foreseen that one arranges the means of coupling and orients the linear axes of motion, or alternatively the linear force axes of the linear drive, of the blowing nozzle, as well as of the stretching rod, both in a parallel manner, as well as also to coincide in a spatial direction, such that no or only reduced additional torque force is transmitted into the linear guides.

A blowing station is generally, among other things, formed by a control block. A device is an integral component of or attached the control block. The device is designed in such a manner that a drive linear motion and force can be transmitted to the blowing station.

According to the invention, coupled motions are realized, which allow linear motions that are coordinated with one another in such a manner that the blowing nozzle is initially moved in the desired position and subsequently the stretching rod is displaced linearly for the purpose of the stretching of the container in either an absolute or at least effective manner.

The sequential, successive movement kinetics is in particular advantageous, when the blowing nozzle is to be sealed against a support ring. In the case of a seal against the support ring, it is necessary on the one hand to avoid damage to the support ring of the preform, beyond this a secure seal must also be assured in the case of manufacturing tolerances as well as when taking into consideration the ageing of construction materials and temperature-dependent material expansion.

In a preferred embodiment of the invention, a drive is used that is employed for all linear motions that are to be realized within the blowing station. The drive can function making use of any known physical or alternatively technical principle, for example, linear motors, rotary motors such as electric or fluid drives in connection with suitable drives such as hypocycloid or Cartwright linear guides or hydraulic direct drives.

Pneumatic drives are also conceivable, however, as a consequence of the compressible media, the control of the precise positioning can only be achieved at great expense and is frequently therefore less suitable.

A parting line between the linear drive and the coupling means can be foreseen through the use of a suitable separation means, so as to, for example, balance out eccentricity or axes imprecisions of the respective paths of motion of the linear drive and the coupling means, or alternatively of the axes of motion of the blowing nozzle and stretching rod.

Round latch locks, which are available as standardized standard construction parts, have shown themselves to be reliable for this purpose. The coupling means can be formed by bell crank and linking levers or through a combination of pressure cylinders that fluidly communicate with one another, which, together with corresponding connection elements and coupling brackets, initiate the required movement kinetics of the blowing nozzle for the mechanical preload of the sealing element and the stretching of the preforms by means of the stretching rod.

It has been shown to be particularly advantageous for the absorption of forces, that the axes of motion are arranged in symmetrical center position of the device, in such a manner that a common symmetrical spatial axis, relative to the device can be created.

A high-load capacity is facilitated when the coupling means are formed by mechanical means substantially consisting of one drive member, at least one toggle lever and at least one coupling rod.

A transmission of force showing minimal shearing force is in particular facilitated when the mechanical coupling means are symmetrically arranged within the device, in such a manner that the resulting line of action of the force is largely congruent with the motion axis of the stretching rod.

It is furthermore particularly preferred that the toggle lever and the coupling rod are designed and arranged in such a manner that the reaction forces of the blowing in terms of the common spatial axis, can be absorbed by the device substantially free of any shear force and torque.

A defined ability to position is thereby facilitated when the at least one toggle lever, when in its locked setting, is adjacent to a stop and interacts with the holding magnet, in such a manner that it is able to be maintained in the locked setting.

A reproducible motion pattern is thereby facilitated when the at least one toggle lever, in its locked setting, is monitored by a limit stop switch.

An unintentional displacement is thereby avoided when the at least one toggle lever is located at or in the vicinity of the dead point in the locked setting.

According to an embodiment variant, it has been imagined that the coupling means are made up of fluid means, substantially consisting of at least one driving cylinder and at least one blowing nozzle cylinder.

A further optimization can also occur when the at least one blowing nozzle cylinder is designed and arranged in such a manner that the resulting line of action of the forces is largely congruent with the axis of motion of the stretching rod.

An adaptability to the control guidelines can be achieved thereby when the fluid coupling means furthermore comprise at least one control unit for the control of the fluid flow between the driving cylinder and the blowing nozzle and that the fluid is routed through valves and conduits.

According to a further embodiment variant, it has been imagined that the driving cylinder with its cylinder rod on the terminal end is received in curved guidance grooves of the drive member in such a manner that in the case of a linear path of motion of the drive member in the direction of the blowing nozzle, the fluid volume of the driving cylinder on the piston-side is displaceable through conduits in a piston-side fluid volume of the blowing cylinder.

A further constructive development consists in having a coupling bracket arranged between the blowing nozzle and the coupling means.

In particular, it is possible that the coupling bracket and the drive member are guided on a stretch slide guide.

A low-maintenance operation is facilitated when the stretch slide guide is a lubrication-free slide guide.

For the provision of drive energy, it has been imagined that the linear drive motion that is to be transmitted is to be realized by a linear drive and/or a coupler mechanism.

In particular, it is foreseen that the linear drive motion that is to be transmitted is realized by a coupler mechanism.

A more compact construction and a dependable operation are facilitated when the coupler mechanism can be driven by a rotary drive motor and the linear drive motion is initiated through a thrust rod in the device.

According to a particular embodiment, it is foreseen that the coupler mechanism is realized through a hypocycloid linear guide.

According to another embodiment, it is foreseen that the coupler mechanism is realized through a Cartwright linear guide.

A further realization variant consists in that the one separation means forms at least one separation plane between the coupling means and the linear drive.

A realization is also possible in that the separation means is formed by a round latch lock.

Figure 2:
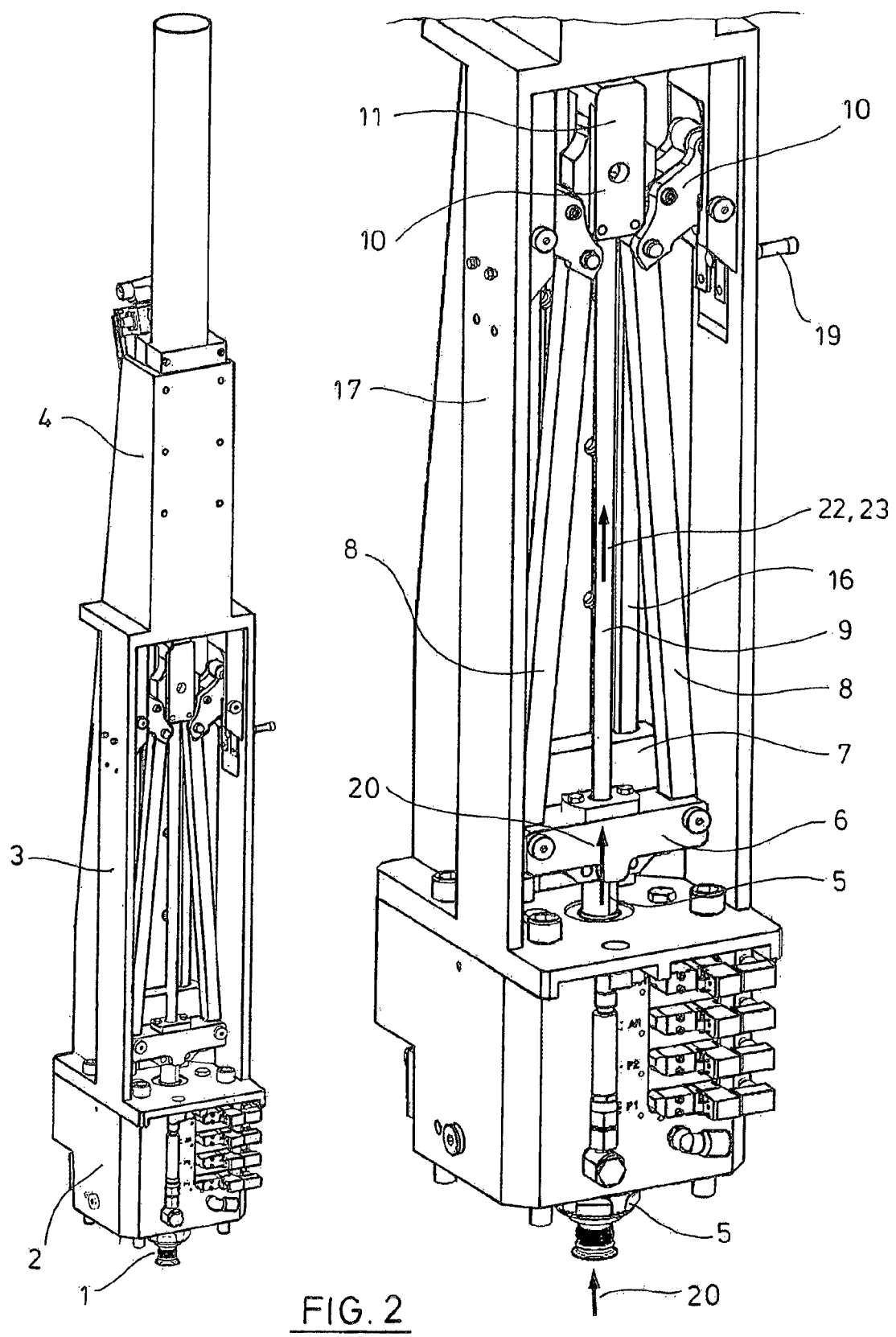
Figure 3:
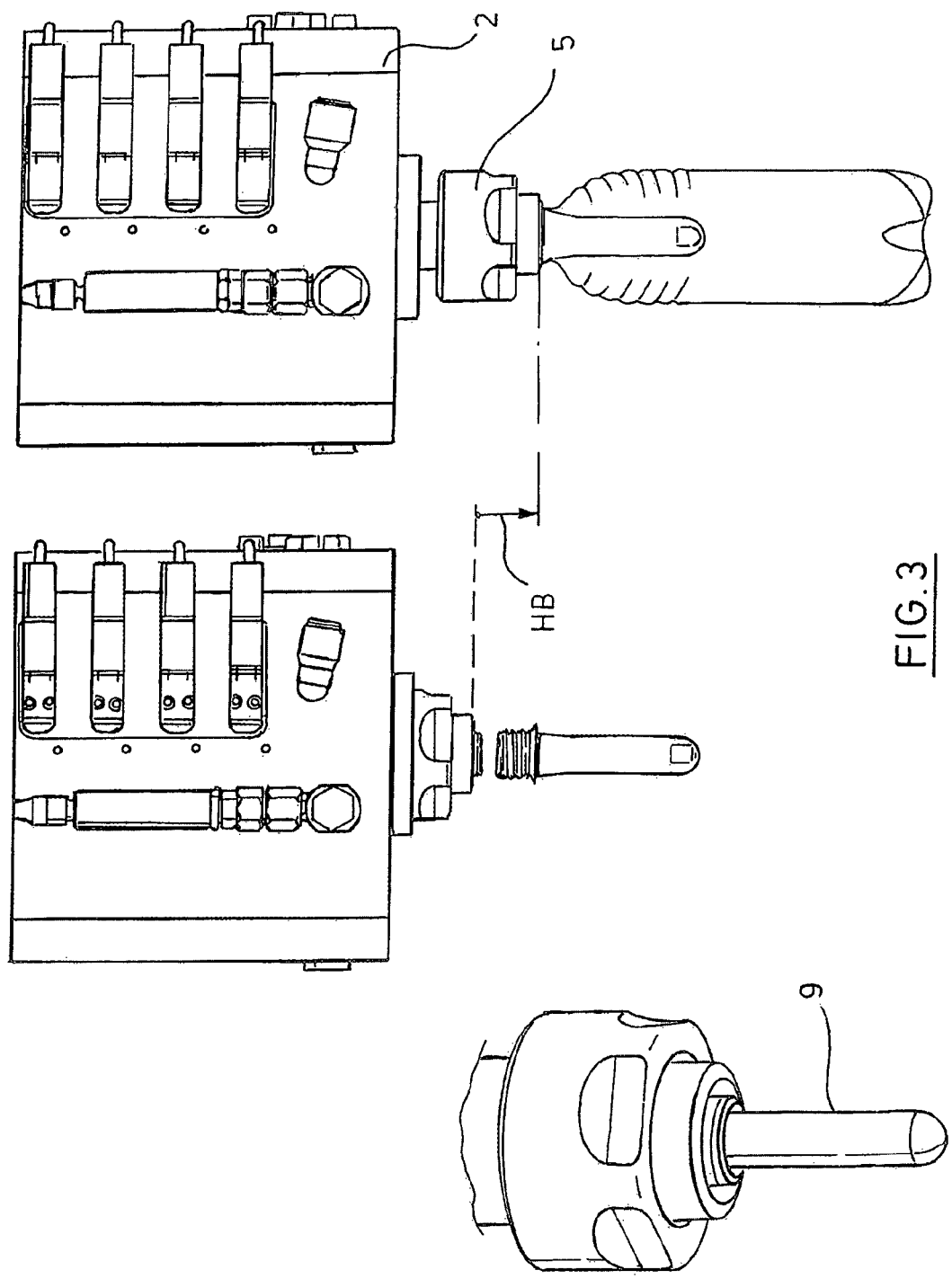

Execution examples according to the invention are schematically represented in the Figures. They show:

FIG. 1 a schematic, abstract representation of a blowing station with the device for the blow-molding of containers from preforms, attached on a valve block and with a drive for the generation of a linear motion or alternatively linear force, which respectively couples the stretching rod and the blowing nozzle through the coupling means, FIG. 2 a perspective representation of a blowing station with the device for the blow-molding of containers from preforms, attached on a valve block, in a first preferred embodiment with coupling means in the form of toggle levers and coupling rods in the situation before the linear motion path of the blowing nozzle and the stretching rod, FIG. 3 a perspective representation of the blowing nozzle with stretching rod, which extends beyond the blowing nozzle mouth (left figure), the control block with blowing nozzle in a position, before the blowing process (middle image), the control block with blowing nozzle in a position, after the blowing nozzle has travelled the distance of the "blowing nozzle stroke" HB in the path of motion and has realized the mechanical preload of the sealing element against the support ring of the preform, whereby for illustration purposes both the preform as well as the container are represented (right image).

Figure 4:
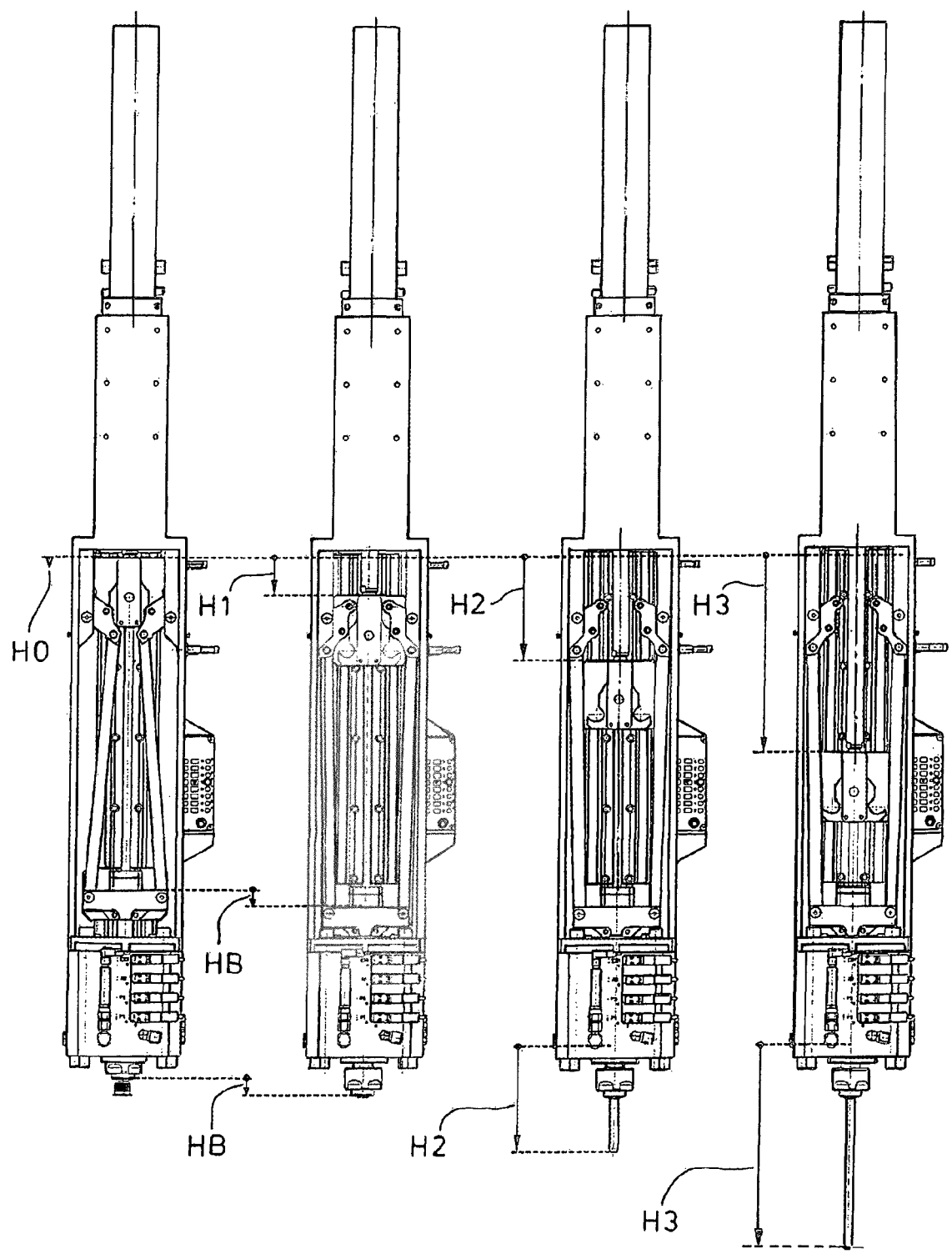
Figure 5:
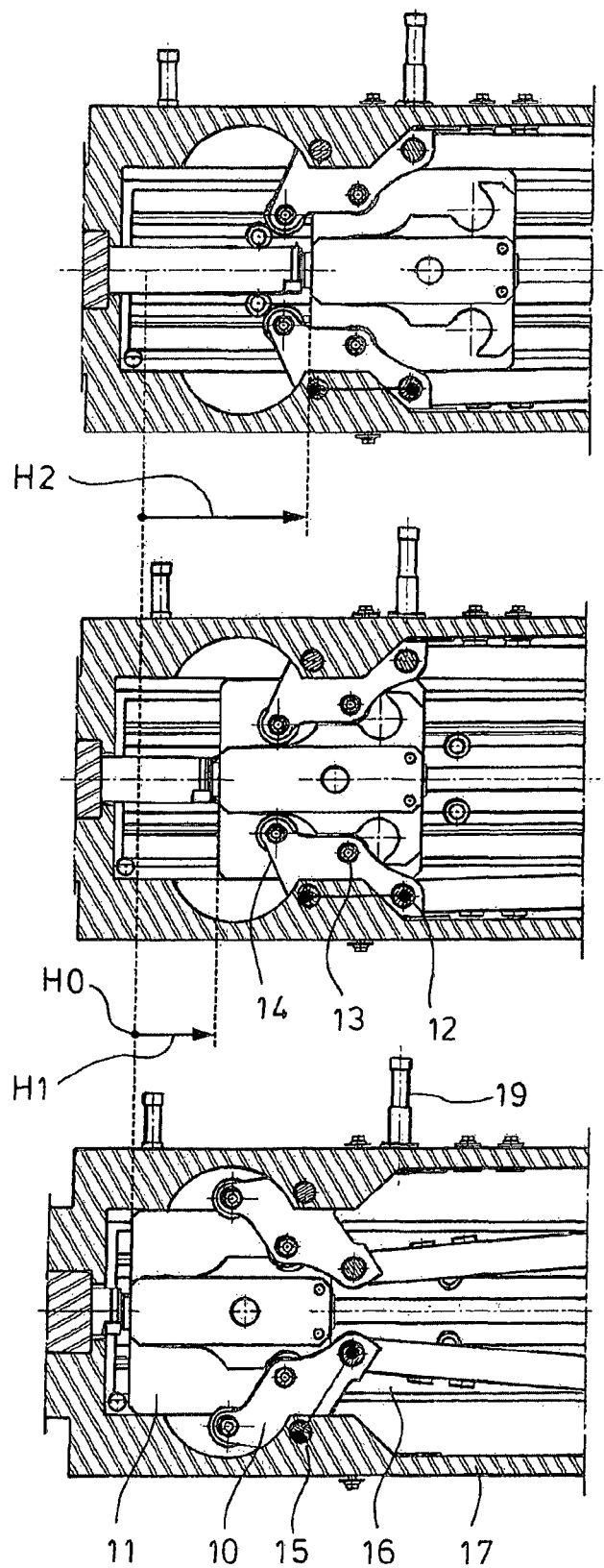
Figure 6:
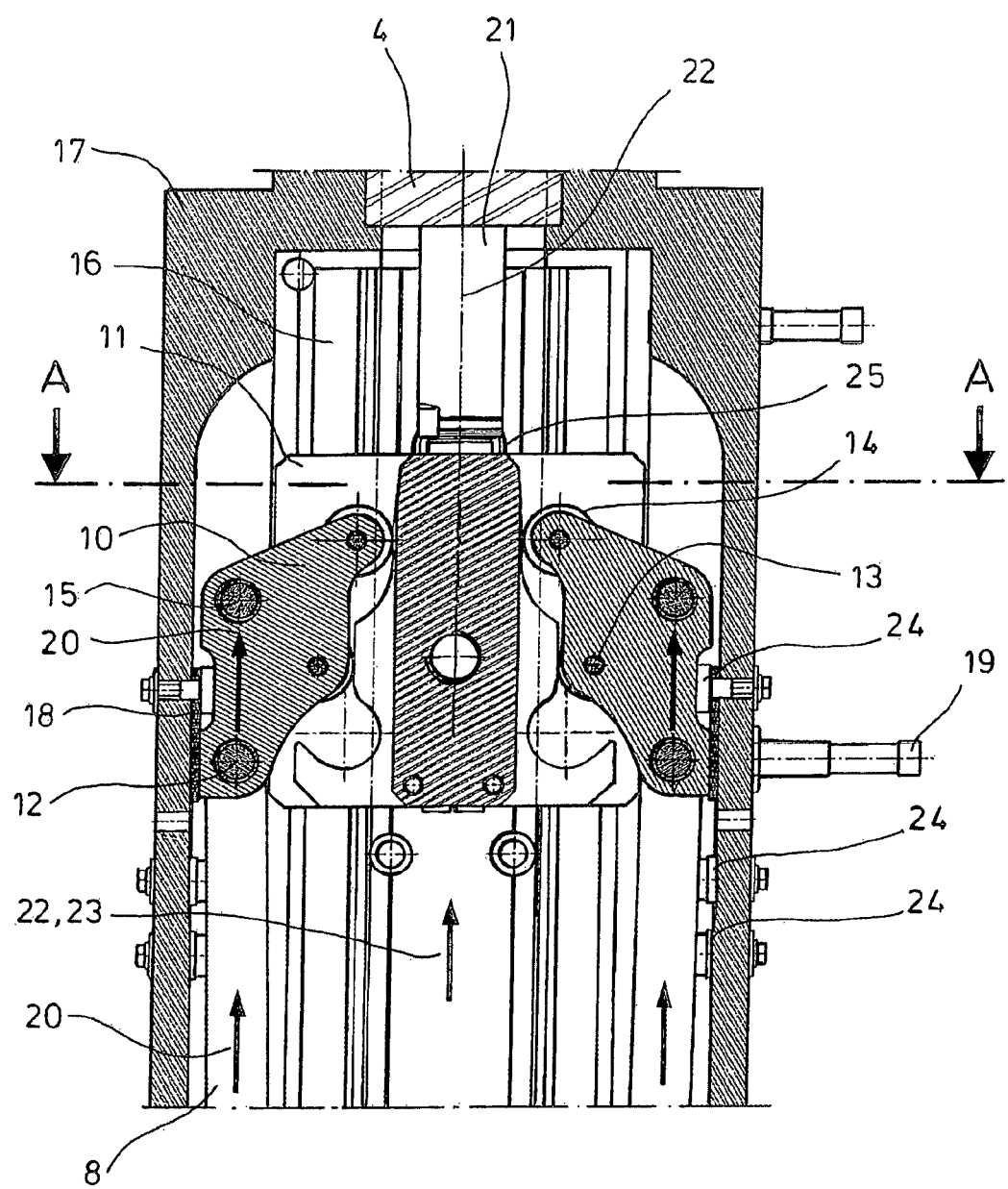
Figure 7:
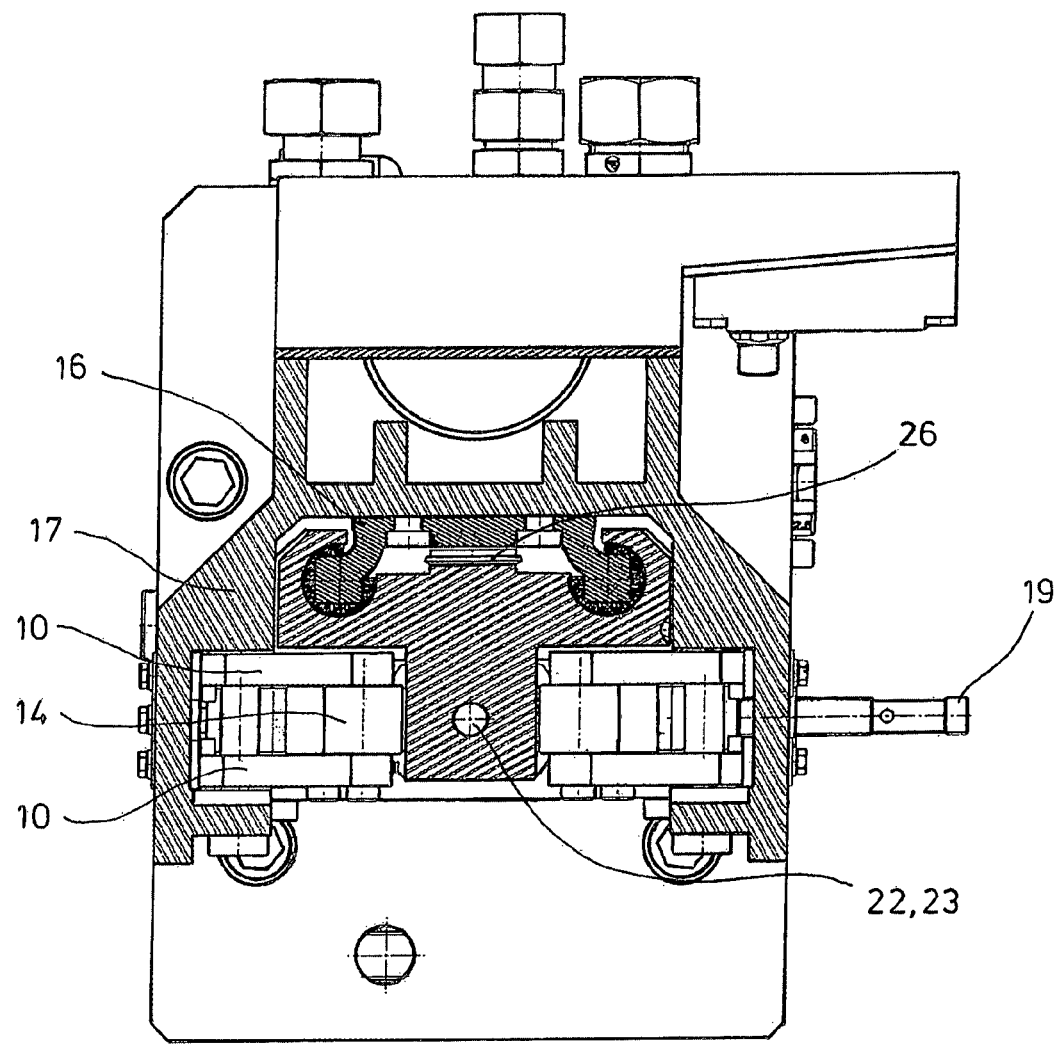
Figure 8:
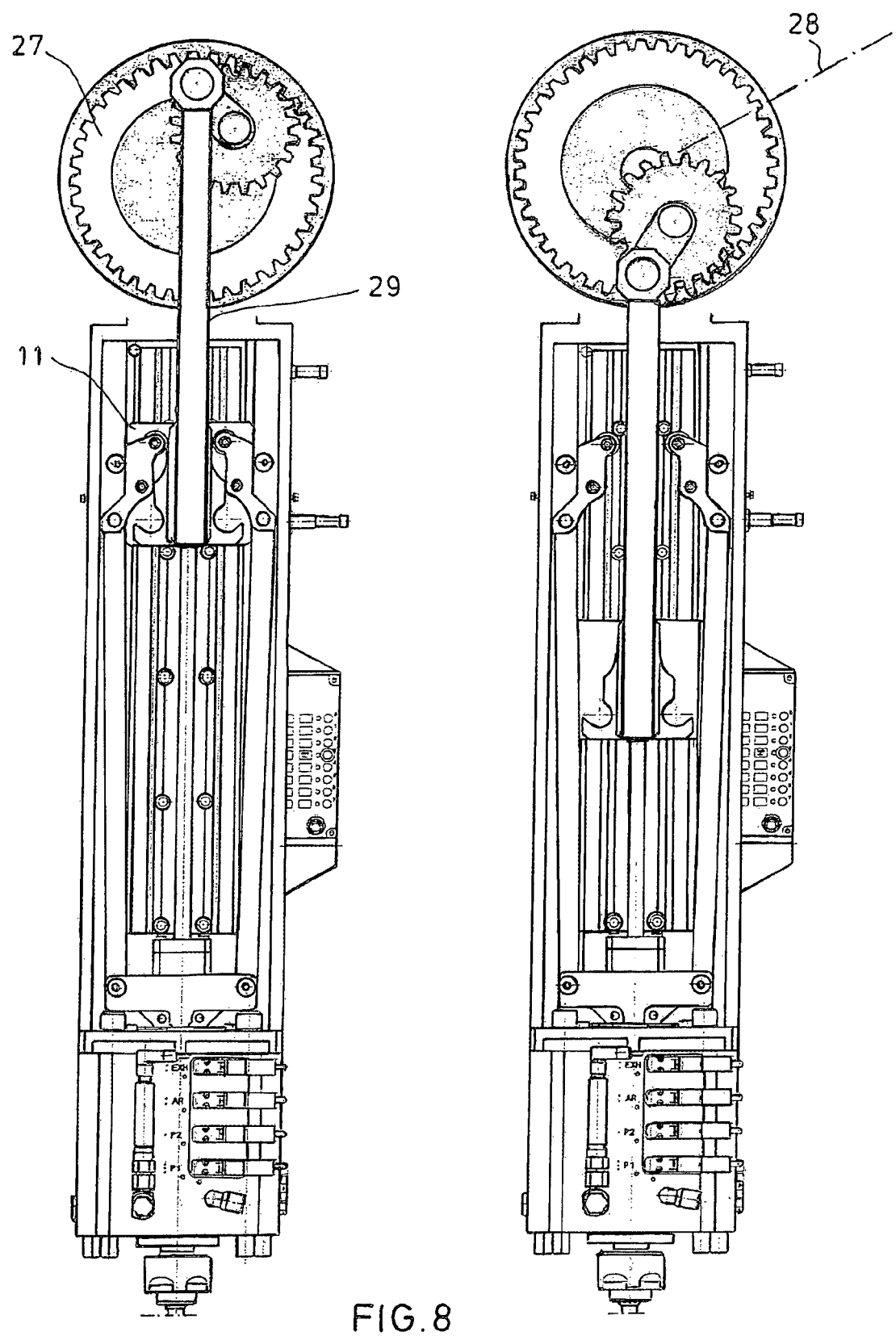
Figure 9:
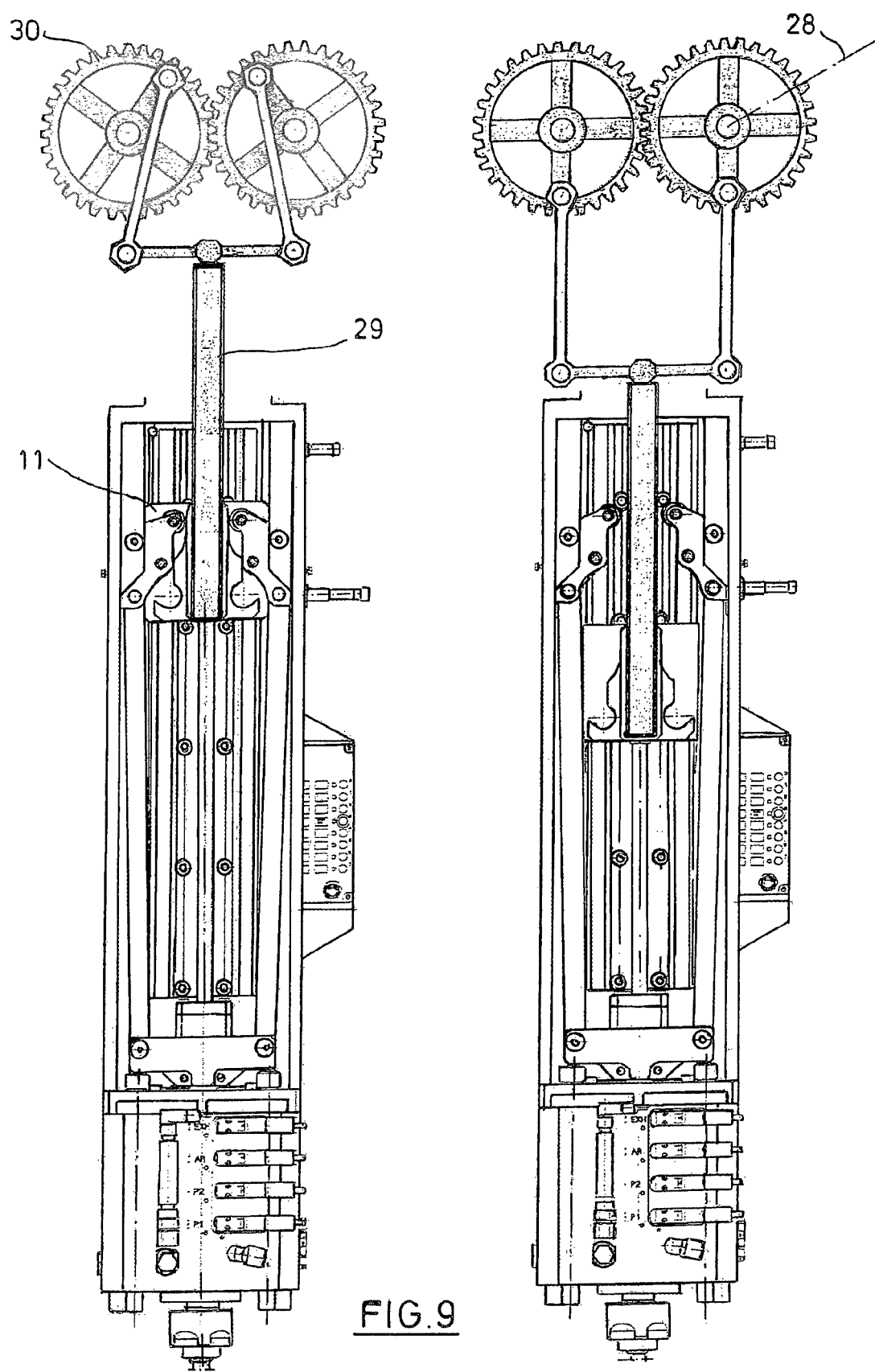
Figure 10:
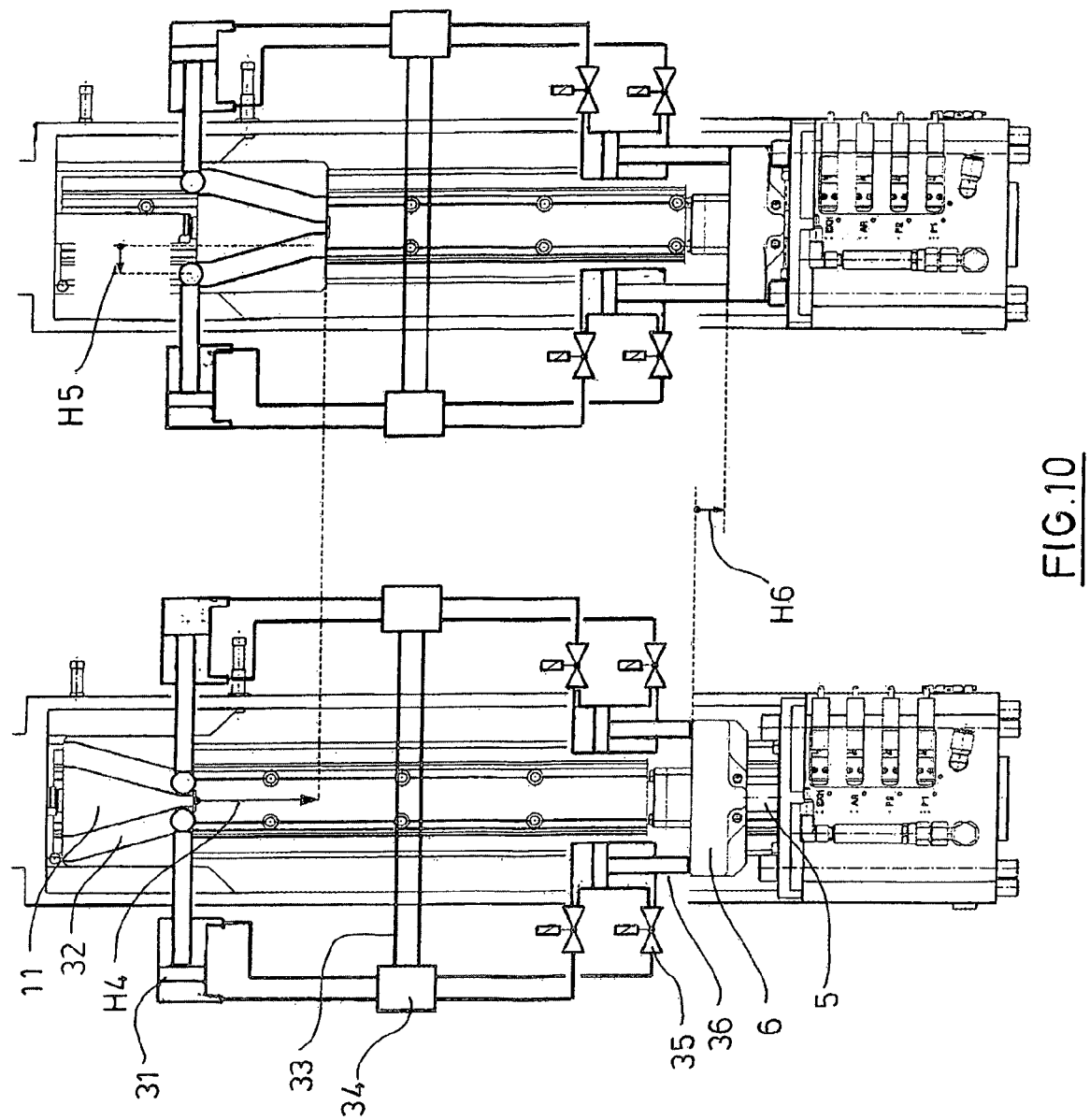

FIG. 4 the blowing station in various temporal stages during the blowing procedure from left to right, FIG. 5 the detailed representation of the drive members and the coupling means for the blowing nozzle of a first preferred embodiment in various temporal stages during the blowing process from left to right, FIG. 6 the detailed cross-sectional representation of the toggle lever locking as a first preferred embodiment of the coupling means, FIG. 7 the detailed cross-sectional A-A representation of FIG. 6 with stretch slide guide, FIG. 8 a representation of the blowing station with the device for the blow-molding of containers from preforms, attached on a valve block, in a further preferred embodiment with coupling means in the form of toggle levers and coupling rod in the situation before (left image) and after (right image) the linear travel path of the blowing nozzle and stretching rod, whereby a hypocycloid linear guide is interposed between a rotary driven motor and the blowing station, FIG. 9 a representation of the blowing station with the device for the blow-molding of containers from preforms, attached on a valve block, in a further referred embodiment with coupling means in the form of toggle levers and coupling rods in the situation following the linear travel of the blowing nozzle for the mechanical preload of the sealing element against the support ring of the preform (left image) and a partial linear motion of the stretching rod (right image), whereby a coupler mechanism in the form of a Cartwright linear guide is interposed between a rotary driven motor and the blowing station, and FIG. 10 a representation of the blowing station with the device for the blow-molding of containers from preforms, attached on a valve block, in a further preferred embodiment with coupling means realized through fluid, here hydraulic coupling by means of blowing nozzle and driving cylinders in the situation before (left image) and after (right image) the linear travel path of the blowing nozzle and stretching rod, whereby every previously represented linear drive can be used.

FIG. 1 shows a schematic abstract representation of a blowing station (40) with the device (3) for the blow-molding of containers from preforms. The preforms are attached on a valve block (2). A drive (41) is used for the generation of a linear motion or alternatively for linear force, which is transmitted through coupling means (44, 45) which respectively couple the stretching rod (9) and the blowing nozzle (5). There is furthermore the schematic representation of the linear stretch slide guide (16) for the guidance of the coupling means (44, 45), the stretching rod (9) and the blowing nozzle (5). The technical teaching according to the invention recognizes that, for the achievement of the easiest possible linear guidance without any lubrication, it is advantageous to arrange the coupling means (44, 45) in a symmetrical manner with respect to a spatial axis (30) and concurrently also both align the linear axes of motion or alternatively force axes (22, 23) of the linear drive (41), of the blowing nozzle (5) as well as of the stretching rod (9) to the same, as well as also in have the same coincide in a spatial direction, in such a manner that only reduced additional torque forces are transmitted to the linear stretch slide guides (16). The illustration of the principle of the blowing station (40) is demonstrated by the symmetrical construction.

FIG. 2 shows the perspective representation of a blowing station (40) with the device (3) for the blow-molding of containers from preforms attached on a valve block (2), in a first preferred embodiment with coupling means (44) in the form of toggle levers (10) and coupling rods (8) in the situation before the linear travel path of the blowing nozzle (5) and of the stretching rod (9).

The drive (41) for the generation of a linear motion or alternatively of a linear force is realized in the execution example represented in FIG. 2 by a linear motor (4), which is attached to the device (3) and by means of the posts of the device (17) on the valve block (2). The posts (17) of the device absorb the linear reaction forces of the blowing nozzle (5) and stretching rod (9) during their linear travel paths and, as regards their common spatial axes (30), are symmetrically designed in such a manner that no reactive torque loads are introduced in the construction.

A further advantage according to the invention can be found in that, upon execution of the blowing procedure, any occurring kickback will be deviated without torque and be supported by means of the toggle lever by the construction.

A slight tipping that occurs on the basis of inertia is likewise tolerated according to the invention and eventually occurring forces and torque are absorbed.

The symmetrically-arranged toggle levers (10) are deflected by the linear movable drive member (11) in such a manner that the coupling rods (8) that are movably attached on the toggle levers (10), as a result of the linear motion of the common circular arc path of the coupling points of toggle levers (10) and coupling rods (8), impress, in the direction of the valve block (2), a linear motion on a thrust rod that is equal to the one at the opposite end of the coupling bracket (6) that is movably attached to the coupling rods (8).

The blowing nozzle (5) that is positively connected with the coupling bracket (6) is likewise moved in a linear manner and thereby realizes the mechanical preload of the mouth-sided sealing element of the blowing nozzle (5) against the support ring of the preform.

In the left image, FIG. 3 shows a perspective representation of the blowing nozzle (5) with stretching rod (9), which extends beyond the blowing nozzle mouth. The middle image shows the control block (2) with blowing nozzle (5) in a position before the blowing process, which is to say in a positioning that is concentric and above the threaded end of a preform.

The right image shows the blowing position. When compared to the middle representation, the control block (2) with blowing nozzle (5) in the right image has travelled the distance HB, which is to say the stroke of the blowing nozzle, in the path of motion. In so doing, the mechanical preload of the sealing element against the support ring of the preform is realized.

FIG. 4 shows the blowing station (40), as represented in FIG. 2, in various temporal stages of the blowing process. The movement kinetics that are made possible by the coupling means (8, 10) will be expounded upon here below as the strokes of the individual components. The linear drive (4) that is shown here, simply as an example, as an electrical linear motor induces a downward linear motion both of the drive member (11) as well as of the stretching rod (9).

It is preferred when the drive member (11) and stretching rod (9) are positively or force-fittingly connected, so that the induced linear motion drives both equally. In the H0 setting, the drive member (11) is located in its upper position within the device (3). After a travel path H1, the drive member (11) has deflected the toggle lever (10) and as a consequence of the coupled motion by the symmetric coupling rods (8) with the coupling bracket (6), the blowing nozzle (5) is moved into the blowing position by the "blowing nozzle stroke" HB. Concurrently, the stretching rod (9) is moved a distance of the stroke H1 (HB unequal to H1), it is however arranged in such a manner in relation to the blowing nozzle (5) that the end portion of the stretching rod (9) still does not exit out of the blowing nozzle mouth (5) after the travel path H1.

Following a travel path H2, the drive member (11) takes on a position beneath the toggle lever (10). The stretching rod (9) is likewise moved the distance of the stroke H2, depending on the relative location prior to the travel path, the tip of the stretching rod protrudes by the amount H2–H1–x beyond the mouth of the blowing nozzle (5).

The maximum required linear deflection of the stretching rod (9) is reached following a travel path H3, which is independent of the container height that is to be realized. The linear deflection stroke H3 means the final position for the stretching rod (9) and the drive member (11), in this position the container is both conclusively extended as well as also blown out.

FIG. 5a through FIG. 5c illustrate, by means of three images, the operating principle and the cooperation of drive member (11) and toggle levers (10). In the H0 setting, the drive member (11) has reached its upper position within the device (3). Following a travel path H1, the drive member (11) has deflected the toggle lever (10) by means of the support roll (13) and locked it. The locking, which is to say, the persistence in the deflected position, occurs when the coupling rods (8) are coupled with the toggle levers in a coupling point (12) in such a manner that in the deflected toggle lever position have travelled up to or beyond the dead point.

The dead point is defined as the relative situation of the coupling point (12) to the pivot point (15) of the toggle lever (10), in which the force vectors that affect the toggle lever are generated in a manner such that the resulting triangle of forces coincide in a spatial line and only work along this line. On the basis of its linear setting following the motion path H1, the drive member (11) limits the deflection of the toggle lever (10) to the dead point setting since the counter rollers (14) of the toggle lever (10) abut longitudinally. Following a travel path H2, the drive member (11) has released the toggle lever (10).

FIG. 6 shows the coupling through the toggle lever (10) in a detailed longitudinal section. A linear motion and force is induced in the device (3) and the stretching posts (17) of the blowing station (40) by means of the linear axis of motion (22) of the linear drive (41), here in the form of a linear motor (4). The force and motion axes (22, 23) of the linear motor (4) and the stretching rod (9) have an identical central location. The same also holds true for the resulting line of action of the force of the coupling rods (8) on the basis of their symmetrical and central arrangement, which absorb the blowing nozzle forces (20).

Given the lack of offset, lever arms are practically nonexistent, the sole direction of force application cannot therefore create any appreciable torque or alternatively any tilting moment. In order to be able to ensure the toggle lever stop position at or near the dead point, only limited retaining force is required.

The teaching according to the invention furthermore suggests holding magnets (24), which are attached to the posts of the device (17) and correspond both with the toggle levers (10) as well as also with the coupling rods (8) in such a manner that the location of the dead point is maintained, as long as there are no forces on the system that exceed the magnetic holding forces. A limit stop switch (19) can be foreseen, to monitor the stop position.

FIG. 7 represents the A-A cross-section from FIG. 6 and shows an example according to the invention of the constructive design of the stretch slide guide (16), which is here depicted as a round-shaped slide guide. A holding magnet (26) can be foreseen on the drive member (11) on the longitudinal side to the bar posts (17). It is also recognizable from this cross-sectional view that the force and motion effect lines (22, 23) are parallel to one another and are centrally and symmetrically positioned within the device (17).

FIG. 8 shows the representation of the blowing station (40) with the device for the blow-molding of containers (3) from preforms, attached on a valve block (2), in a further preferred embodiment with coupling means (44) in the form of toggle levers (11) and coupling rods (8) in the situation before (left image) and after (right image) the linear motion path of the blowing nozzle (5) and the stretching rod (9), whereby a hypocycloid linear guide (27) is interposed between a rotary driven motor and the blowing station (40).

In this embodiment variant, the previously described electric driven motor (4) is thus replaced as the linear drive by a hypocycloid drive (27) and a thrust rod (29). The drive is powered by a rotary, for example, by an electric direct current motor, an alternating current motor or a servomotor (28). A highly-accurate linear guiding of the drive member (11) is not in particular required, due to the use of a thrust rod (29), if necessary combined with separation means (42), which is to say, the previously described stretch slide guide (16) can be omitted in this variant.

FIG. 9 shows the representation of the blowing station (40) with the device for the blow-molding of containers (3) from preforms, attached on a valve block (2), in a further preferred embodiment with coupling means (44) in the form of toggle levers (11) and coupling rods (8) in the situation following the linear motion of the blowing nozzle (5) for the mechanical preload of the sealing element opposite the support ring of the preform (left image) and after a partial linear motion of the stretching rod (9) (right image), whereby a coupler mechanism in the form of a Cartwright linear guide (30) is interposed between a rotary driven motor (28) and the blowing station (40).

In this embodiment variant, the previously described electric driven motor (4) is thus replaced as the linear drive by a Cartwright linear guide (30) and a thrust rod (29). The drive is powered by a rotary, for example, by an electric direct current motor, an alternating current motor or a servomotor (28). A highly-accurate linear guiding of the drive member (11) is not in particular required, due to the use of a thrust rod (29), if necessary combined with separation means (42), which is to say the previously described stretch slide guide (16) can be omitted in this variant.

FIG. 10 shows a representation of the blowing station (40) with the device for the blow-molding of containers (3) from preforms, attached to a valve block (2), in a further preferred embodiment with coupling means (44), realized through fluid coupling, in this case hydraulic, by means of blowing nozzle and cylinders (31, 36) in the situation before (left image) and after (right image) the linear travel path of the blowing nozzle (5) and stretching rod, whereby every previously represented linear drive can be used.

In the case of these coupling means, the drive member (11) is provided with curved guidance grooves (32), in which the driving cylinder (31) with the end portions of its cylinder rods is guided in such a manner that, in the case of a linear travel path of the drive member (11), the piston-side fluid volume is displaced by means of conduits (33) and an optional control unit (34) as well as valves (35) in a piston-side fluid volume of the blowing nozzle cylinder (36).

The fluid volumes of the cylinders (31, 36) and the design of the curved guidance grooves (32) are coordinated with one another in such a manner that with a drive member stroke H4, the driving cylinder (31) is stimulated to a stroke distance H5 and that, as a consequence, the piston-side fluid volume that is displaced out of the driving cylinder (31) into the blowing nozzle cylinders (36) forces the stroke H6.

Response characteristics, movement characteristics and damping can be influenced through the use of control units (34) and/or valves (35). It is however also imaginable to design the cylinders (31, 36) and the conduits (33) in such a manner that no further components are necessary.

The invention claimed is:

1. A device for blow-molding a container from a preform made of a thermoplastic material, comprising:
a stretching rod for stretching the preform;
a blowing nozzle for supplying a blowing gas in the preform and for building up a blowing pressure for expanding the preform; and
coupling means for coupling the blowing nozzle and the stretching rod to achieve coordinated movement kinetics;
wherein a drive motion line of a linear drive motion that is transmitted into the device and axes of motion of the blowing nozzle and the stretching rod run parallel to one another and lay together in a substantially congruent spatial direction such that a common spatial axis is generated, and
wherein the coupling means are mechanical coupling means comprising one drive member, at least one toggle lever and at least one coupling rod.

2. The device according to claim 1, wherein the mechanical coupling means are arranged symmetrically within the device in such a manner that a resulting line of action of force is congruent with the axis of motion of the stretching rod.

3. The device according to claim 1, wherein the toggle lever and the coupling rod are arranged in such a manner that reaction forces of the blowing nozzle in terms of the common spatial axis are absorbed by the device free of any shear force and torque.

4. The device according to claim 1, wherein the at least one toggle lever, when in its locked setting, is adjacent to a stop and interacts with a holding magnet in such a manner that the at least one toggle lever is maintained in the locked setting.

5. The device according to claim 4, wherein the at least one toggle lever is monitored in its locked setting by a limit stop switch.

6. The device according to claim 1, wherein the at least one toggle lever is arranged at or in a vicinity of a dead point in the locked setting.

7. A device for blow-molding a container from a preform made of a thermoplastic material, comprising:
a stretching rod for stretching the preform;
a blowing nozzle for supplying a blowing gas in the preform and for building up a blowing pressure for expanding the preform; and
coupling means for coupling the blowing nozzle and the stretching rod to achieve coordinated movement kinetics;
wherein a drive motion line of a linear drive motion that is transmitted into the device and axes of motion of the blowing nozzle and the stretching rod run parallel to one another and lay together in a substantially congruent spatial direction such that a common spatial axis is generated, and
wherein the coupling means are made up of fluid coupling means comprising at least one driving cylinder and at least one blowing nozzle cylinder.

8. The device according to claim 7, wherein the at least one blowing nozzle cylinder is arranged in such a manner that a resulting line of action of forces is congruent with the axis of motion of the stretching rod.

9. The device according to claim 7, wherein the fluid coupling means further comprise at least one control unit for controlling fluid flow between the driving cylinder and the blowing nozzle cylinder, and wherein fluid is routed through valves and conduits.

10. The device according to claim 7, wherein the driving cylinder has a cylinder rod on a terminal end, wherein the terminal end is received in guidance grooves having a curved cross-section of a drive member in such a manner that in a linear path of motion of the drive member in a direction of the blowing nozzle, a fluid volume of the driving cylinder on a piston-side is displaceable through conduits in a piston-side fluid volume of the blowing nozzle cylinder.

11. The device according to claim 1, wherein a coupling bracket is arranged between the blowing nozzle and the coupling means.

12. The device according to claim 11, wherein the coupling bracket and the drive member are guided on a stretch slide guide.

13. The device according to claim 12, wherein the stretch slide guide is a lubrication-free slide guide.

14. The device according to claim 1, wherein the linear drive motion is transmitted by a linear drive and/or a coupler mechanism.

15. The device according to claim 1, wherein the linear drive motion is transmitted by a coupler mechanism.

16. The device according to claim 15, wherein the coupler mechanism is driven by a rotary drive motor and the linear drive motion is transmitted through a thrust rod in the device.

17. The device according to claim 15, wherein the coupler mechanism comprises a hypocycloid linear guide.

18. The device according to claim 15, wherein the coupler mechanism comprises a Cartwright linear guide.

19. The device according to claim 14, wherein one separation means generates at least one separation plane between the coupling means and the linear drive.

20. The device according to claim 19, wherein the separation means comprises a round latch lock.

21. A blowing station for blow-molding a container from a preform made of a thermoplastic material, the blowing station comprising a control block that is attached to a device according to claim 1.

22. The device according to claim 7, wherein the axes of motion are arranged in a symmetrical central position of the device in such a manner that a common symmetrical spatial axis is generated relative to the device.

23. The device according to claim 7, wherein the linear drive motion is transmitted by a linear drive and/or a coupler mechanism.

24. The device according to claim 7, wherein the linear drive motion is transmitted by a coupler mechanism.

25. A blowing station for blow-molding a container from a preform made of a thermoplastic material, the blowing station comprising a control block that is attached to a device according to claim 7.

26. The device according to claim 1, wherein the axes of motion are arranged in a symmetrical central position of the device in such a manner that a common symmetrical spatial axis is generated relative to the device.

* * * * *